Sept. 14, 1954    R. W. SPAFFORD    2,688,933
CONVEYER APPARATUS AND CONTROL SYSTEM THEREFOR
Original Filed July 4, 1945    3 Sheets-Sheet 1

Inventor:
Ralph W. Spafford
By Hess, Ehr & Mackenburg
Attys.

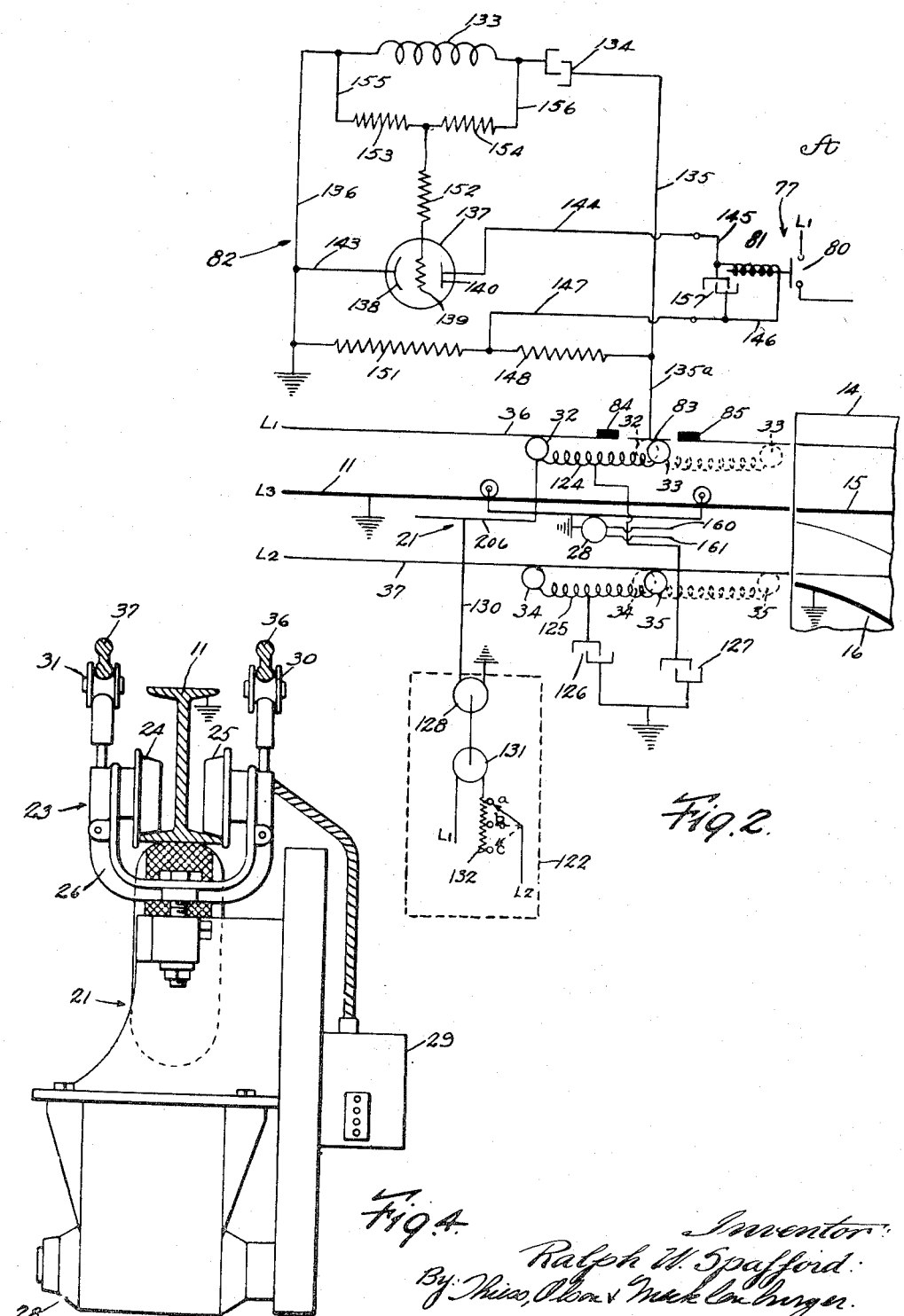

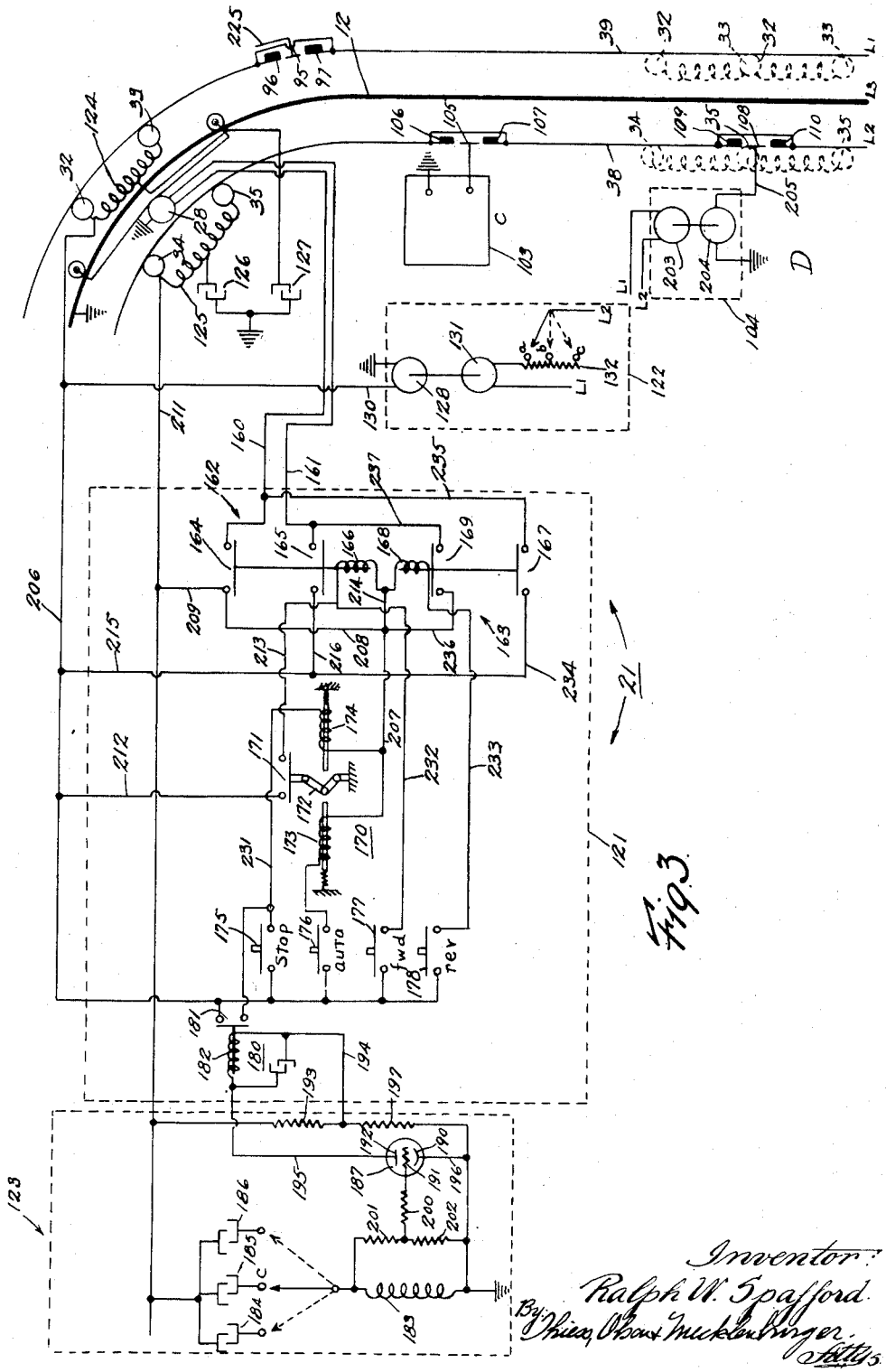

Patented Sept. 14, 1954

2,688,933

UNITED STATES PATENT OFFICE 2,688,933

CONVEYER APPARATUS AND CONTROL SYSTEM THEREFOR

Ralph W. Spafford, Euclid, Ohio, assignor to The Louden Machinery Company, Fairfield, Iowa, a corporation of Iowa Continuation of application Serial No. 719,575, December 31, 1946, which is a division of application Serial No. 603,158, July 4, 1945. This application February 5, 1953, Serial No. 335,231

13 Claims. (Cl. 104—88)

This application is a continuation of application Serial No. 719,575, filed December 31, 1946, which is a division of the co-pending application of Ralph W. Spafford and C. Wayne Heil, Serial No. 603,158, filed July 4, 1945, both applications being abondoned.

This application relates to conveyor apparatus and control systems therefor, more particularly to control systems for conveyors moving on a network of trackways in which it is necessary to selectively control the operation of conveyors at desired points along the network of trackways, and it is an object of the invention to provide an improved conveyor control system of this character.

It is a further object of the invention to provide an improved conveyor control system in which conveyors moving on a network of trackways may be selectively controlled to make turns from one trackway to another and may be selectively controlled to stop at desired points along the trackway network.

Conveyor systems vary from small installations having a single trackway upon which a single conveyor is adapted to move to installations having a number of trunk trackways from which branch trackways extend at desired intervals with numerous conveyors adapted to move on the trackway network. In conveyor apparatus having only a single trackway, it is frequently desirable or necessary that conveyors moving along the trackway be selectively controlled to stop at different points on the trackway. That is, one conveyor may be required to stop at one point while a second conveyor may be required to stop at a different point at some other position along the trackway while a third conveyor may be required to stop at still another point along the trackway. In conveyor systems where there are a plurality of branch trackways extending from one or more trunk trackways, it is necessary to control track switches to direct a conveyor from a trunk trackway onto a particular branch trackway. Here it is necessary and desirable that the track switches be selectively controllable so that one conveyor may turn off of a trunk trackway onto one branch trackway, while a second conveyor following immediately behind the first will go on through on the trunk trackway and turn off onto a different branch trackway at some other point. After a conveyor has moved onto a branch trackway from a trunk trackway, the situation is virtually the same as a single trackway and conveyors moving thereon must be capable of selectively stopping at one of a plurality of different points along the branch trackway.

In a conveyor system conveyors, whether loaded or empty, begin their travel at some point under the control of an operator who determines to what point in the system a particular conveyor is to go. It is desirable that the operator be able to control with exactitude the point to which that conveyor goes and that after the conveyor leaves the control of the operator it will follow the pathway determined for it and arrive at the desired point. This, of course, may involve making one or more turns requiring the operation of one or more track switches as well as the operation of stopping mechanism when the conveyor reaches the desired point. Accordingly, it is clear that control means must be provided on the conveyor which move along with the conveyor in its travel and which can be set by the operator before it leaves his control so that the conveyor will move past track switches which it is not desired to operate and will send out a control impulse to operate the proper track switch and, furthermore, the control means will operate so that the conveyor will move past stopping stations at which it is not intended to stop and will selectively operate the stopping mechanism at the station where it is desired that the conveyor stop.

Adjacent each track switch that controls a change from a trunk trackway onto a branch trackway and at each point along the trackways where it is desired to stop a conveyor, it is necessary to have some stationary control apparatus or operating mechanism to co-operate with the control apparatus on the conveyor. Such stationary apparatus in the case of a track switch actuates means such as a motor for moving the track switch and in the case of stopping the conveyor controls the driving means for the conveyor which may be an electric motor, for example. The problem for which the present invention is an improved solution is one of selectively operating the control apparatus on the conveyor as well as the stationary control apparatus at more than one point along the trackway or to discriminate between the control apparatus at different points.

The invention disclosed in this application will be described in connection with overhead monorail conveyor apparatus but it will be apparent to those skilled in this art that changes may be made to adapt the invention for use on other types of conveyor apparatus such, for example, as those running on tracks laid upon the ground without departing from the spirit and scope of the invention.

In carrying out the invention in one form conveyor apparatus including a trackway and conveyors adapted for movement along the trackway are provided. To control the operation of the conveyors a plurality of generating means for producing a plurality of different frequencies along with a plurality of utilization means, each of which is responsive to one of the generated frequencies, are associated with the trackway and the conveyors. Means responsive to the conveyor movement are arranged for sequentially connecting the generating means and the utilization means in individual electric circuits whereby the individual utilization means are effectively energized only when connected to generating means producing its responsive frequency.

More particularly, in conveyor apparatus including a trunk trackway, a plurality of branch trackways and a plurality of track switches to connect the branch trackways to the trunk trackway, each conveyor is provided with a generator capable of generating one of a plurality of selected frequencies and adjacent each track switch there is a circuit responsive to one of the plurality of frequencies for controlling the movement of the associated track switch. As the conveyors move along the trackways the generators and the circuits are sequentially connected together by the trolleys on the conveyors whereby a particular circuit responds to control the track switch movement only when the frequency of the generator on the conveyor corresponds to the responsive frequency of the particular circuit contacted. Each conveyor also includes a circuit which is selectively responsive to one of a plurality of frequencies to control the conveyor propulsion motor and a plurality of generators are arranged along the trackway where it is desired to stop the conveyor, each generator generating a different frequency. As the conveyors move along the trackway, the trolleys sequentially connect the circuit on the conveyor with the generators on the trackway, whereby the conveyor propulsion motor is stopped only when the frequency of a particular generator corresponds to the responsive frequency of the circuit on the conveyor.

For a more complete understanding of the invention, reference should now be had to the accompanying drawing, in which:

Fig. 2 is a detailed circuit diagram of a portion of Fig. 1;

Fig. 3 is a detailed circuit diagram of another portion of Fig. 1; and

Fig. 4 is a front view of a conveyor shown diagrammatically in Figs. 1, 2 and 3.

Figure 1:
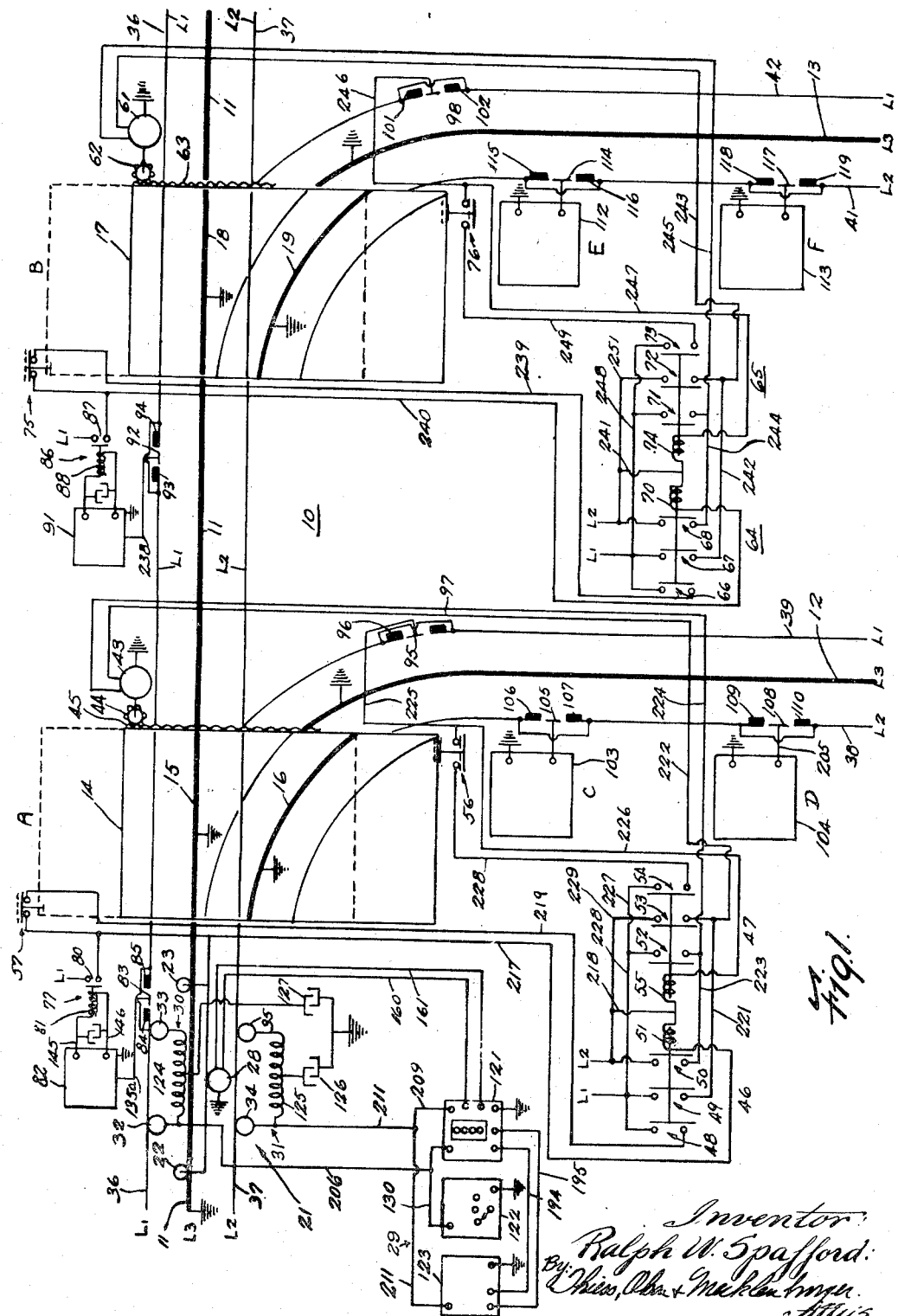
Figure 1 is a diagrammatic representation of conveyor apparatus and a control system therefor embodying the invention.

Referring more particularly to Fig. 1, the invention is shown embodied in a conveyor system 10 having a trunk trackway 11 and branch trackways 12 and 13 extending therefrom at different stations A and B spaced along the trunk trackway 11. At station A there is a track switch 14 movable between two positions having a straight trackway 15 and a curved trackway 16. In one position the trackway 15 registers with the trackway 11 to form a through trackway and in the other position the curved trackway 16 registers with the trackway 11 to form a switch leading from the trackway 11 to the branch trackway 12. Similarly at station B there is a track switch 17 movable between two positions and having a straight trackway 18 and a curved trackway 19. In one position the straight trackway 18 registers with the trackway 11 to form a through trackway and in the other position the curved trackway 19 registers with the trackway 11 to connect with the branch trackway 13. Two stop stations C and D are arranged along the branch trackway 12 spaced apart from each other and two stop stations E and F are similarly arranged along the branch trackway 13. It is contemplated by the present invention that a conveyor moving along the trunk trackway 11 will have its control apparatus predeterminedly set by an operator so that the switch at one of the station A or B will be operated and the conveyor will be controlled to stop at one of the stations C, D, E or F. While only one trunk trackway and a pair of branch trackways are shown, it will become apparent from the specification that more than one trunk trackway may be used as well as more than two branch trackways without departing from the spirit and scope of the invention since the control system is not limited to any number of trunk or branch trackways.

Adapted to move over the trunk and branch trackways is a conveyor 21 which comprises a pair of spaced-apart trolley wheels 22 and 23 which run upon the trackways. Referring to Fig. 4, it will be seen that the trolley 23 consists of a pair of laterally spaced-apart wheels 24 and 25 rotatively supported by shafts on the opposite ends of a U-shaped yoke 26. Each of the wheels 24 and 25 is adapted to run upon the trackways, for example the trunk trackway 11, which may be an I beam, as shown. The trolley 22 of Fig. 1, while not shown in Fig. 4, is substantially identical with the trolley 23 and from the trolleys 22 and 23 the conveyor proper including the conveyor propulsion motor 28 and the control apparatus is supported. Also associated with the conveyor are the current-collecting trolleys 30 and 31 (Fig. 4). The current-collecting trolley 30 consists of a pair of spaced-apart trolley wheels or other types of contacts 32 and 33 and similarly the current-collecting trolley 31 consists of a pair of spaced-apart trolley wheels or contacts 34 and 35 (Fig. 1), the current-collecting trolleys being used to supply power to the propulsion motor 28 as well as to direct the control impulses to stop the conveyor and change its direction of travel. The spacing between the trolley wheels 32 and 33 and 34 and 35 has a value to be indicated subsequently in this specification. Mounted on the conveyor is a control box 29 which contains all of the control apparatus carried by the conveyor necessary to control the conveyor in its movements. The control box contains not only the control for the propulsion motor but also the control mechanism for stopping the conveyor and determining which of the various branch trackways it will move on as will be more completely described subsequently in this specification.

To supply power to the conveyor for propelling it along the trackways, bus bars 36 and 37 extend along the trunk trackway 11, the bus bars 38 and 39 extend along the branch trackway 12 and the bus bars 41 and 42 extend along the branch trackway 13, suitable bus bar sections also being arranged on the track switches 14 and 17, as shown, to supply power to the conveyor while moving on the track switches. The bus bars, as described, form two conductors of a three-wire three-phase power supply and the various trackways 11, 12 and 13 form the other conductors thereof, the three-phase system being indicated by the reference characters $L_1$, $L_2$ and $L_3$ of which $L_3$ is the trackway and is grounded at all necessary points, as shown. While a three-phase system has been shown and the invention will be described in connection therewith, it will be appreciated that a two-wire alternating current supply or a direct current supply may be used. The necessary power is supplied to the conveyor motor by the current-collecting trolleys 32, 33 and 34, 35 contacting the various bus bars, for example the bus bars 36 and 37 as shown in Figs. 1, 2 and 4.

To move the track switch 14 from one position to the other, a three-phase motor 43 is provided and is adapted to drive a gear 44 which engages a rack 45 mounted on the track switch. Power is supplied to the motor 43 by means of the contactors 46 and 47, the contactor 46 controlling the motor to run in a direction to move the track switch 14 so that the curved trackway 16 comes into registry with the trackways 11 and 12, whereas the contactor 47 controls the motor 43 to run in the reverse direction to move the track switch 14 so that the straight trackway 15 registers with the trunk trackway 11. The contactor 46 is provided with three pairs of contacts 48, 49 and 50 all of which are operated by a coil 51, the contactor being normally deenergized and of a type in which the coil 51 must be energized to hold the contacts closed. The contactor 47 is substantially identical with the contactor 46 and includes a plurality of pairs of contacts 52, 53 and 54 operated by a coil 55. The contacts 52, 53 and 54 are normally open and are closed only when the coil 55 is energized, it being necessary to maintain the coil in the energized condition to hold the contacts closed.

Also associated with the track switch 14 to accurately control its final position are the limit switches 56 and 57, the limit switch 56 being normally open and acting to deenergize the coil 55 thereby opening the contacts 52 and 53 and stopping the motor 43 when the track switch 14 reaches the position where the trackway 15 registers with the trackway 11 and the limit switch 57 being normally closed and being actuated by the track switch 14 to deenergize the coil 51, thereby opening the contacts 49 and 50 and stopping the motor 43 when the trackway 16 registers with the trackways 11 and 12.

Similarly to the track switch 14 the track switch 17 is provided with a three-phase motor 61 which drives a gear 62 engaging a rack 63 for moving the track switch 17 from one position to the other. To supply power to the motor 61 the contactors 64 and 65 are provided, the contactor 64 being adapted to supply power to the motor 61 to drive the track switch 17 from the position shown to its position where the trackway 19 registers with the trackways 11 and 13 and the contactor 65 being adapted to supply power to the motor 61 to move the track switch 17 from the position just mentioned to that where the trackway 18 registers with the trackway 11. The contactor 64 includes the pairs of contacts 66, 67 and 68 and coil 70 which actuates the contacts from a normally open position to a closed position, the contactor 64 being of a type wherein the contacts are closed only when the coil is energized and whenever the coil becomes deenergized the contacts open. The contactor 65 is substantially identical with the contactor 64 and includes the pairs of contacts 71, 72 and 73 arranged to be operated by the coil 74. The contacts 71, 72 and 73 are normally open and are actuated to the closed position when the coil 74 is energized and are opened immediately upon deenergization of this coil.

To control the stopping of the track switch 17 in either of its operative positions the limit switches 75 and 76 are associated therewith, the limit switch 75 being normally closed and arranged to open to deenergize the coil 70 and consequently deenergize the motor 61 whenever the track switch 17 brings the trackway 19 into registry with the trackways 11 and 13 and the limit switch 76 being normally open and adapted to deenergize the coil 74 to consequently deenergize the motor 61 whenever the track switch brings the trackway 18 into registry with the trackway 11.

It is contemplated by the invention that the conveyor 21 embodies within itself the necessary mechanism or apparatus to selectively determine which, if either, of the track switches 14 and 17 will be operated to determine whether the conveyor moves straight along the trackway 11 or turns off onto either of the branch trackways 12 and 13. Accordingly, there is associated with the track switch 14 a relay 77 having contacts 80 and an operating coil 81 which is energized by a discriminator 82 brought into effectiveness by the trolley or current collector 32 as the conveyor approaches the track switch 14. Closing the contacts 80 energizes the coil 51 to operate the motor 43. The discriminator 82 is energized through a control section in the bus bar 36 which includes a control conductor 83 spaced between and insulated from the bus bar 36 by the insulators 84 and 85. The control conductor 83 therefore has no energization normally and is energized only when the trolley wheel 32 contacts it. This control section is placed in the vicinity of the track switch 14 but a sufficient distance away from it so that when the control conductor 83 is contacted by the trolley wheel 32, the track switch will be moved from the position shown to the position where the trackway 16 registers with the trackways 11 and 12 before the conveyor reaches the track switch. Similarly to the track switch 14 a relay 86 having contacts 87 and an operating coil 88 is associated with the track switch 17 and is energized by a discriminator 91 which becomes effective when the conveyor 21 approaches the track switch 17. The contacts 87 when closed are adapted to energize the coil 70 to operate the motor 61. The discriminator 91 is energized by the trolley wheel 32 whenever this trolley wheel contacts the control conductor 92 which is spaced between and is insulated from the bus bar 36 by the insulators 93 and 94. The control conductor 92 is spaced adjacent to the track switch 17 but a sufficient distance therefrom so that when the conductor 92 is contacted by the trolley 32 the discriminator 91 will actuate the relay 86 to effect movement of the track switch 17 from the position shown to that where the trackway 19 registers with the trackways 11 and 13 before the conveyor reaches the track switch. Discriminators 82 and 91 co-operate with mechanism on the conveyor so that only the desired one of the track switches 14 and 17 is operated when a conveyor approaches them.

In the interests of simplicity in disclosing a system which embodies the invention, it is contemplated that the track switches 14 and 17 have normal positions which are the positions shown and that a track switch after having moved to a position where a conveyor moves from the trunk trackway onto one of the branch trackways, the track switch is moved back to its normal position. To effectuate this phase of the operation in one instance a control section including a control conductor 95 is associated with the bus bar 39 and is insulated therefrom by the insulators 96 and 97. Whenever the trolley wheel 32 contacts the control conductor 95, i. e., the conveyor 21 has moved from the trackway 11 onto the trackway 12, the coil 55 is energized through a circuit to be described for effecting the movement of the track switch 14 to its normal position. To effectuate this phase of the operation in a second instance the control section which includes the control conductor 98 is associated with the bus bar 42 and is insulated therefrom by the insulators 101 and 102. Whenever the conveyor has moved from the trackway 11 onto the trackway 13 and the trolley wheel 33 contacts the control conductor 98, the relay coil 74 will be energized through a circuit to be described to effectuate movement of the track switch to its normal position.

The invention also embodies the principle that the conveyor control may be set in a predetermined manner so that after the conveyor has moved onto one of the branch trackways it may be selectively controlled to stop at one of a plurality of stop stations, for example, station C or D on the trackway 12. The conveyor is driven by an electric motor 28 which motor is supplied with power from the bus bars and in order to stop the conveyor the power supply to the motor is interrupted by a suitable switch as will become clear. The control impulses are supplied to the conveyor for stopping the conveyor motor on trackway 12 by means of the generators 103 and 104 which will be more completely described. The generator 103 is connected to a control section including a control conductor 105 associated with the bus bar 38 and insulated therefrom by the insulators 106 and 107 similarly the generator 104 is connected to a control section including a control conductor 108 associated with the bus bar 38 and insulated therefrom by the insulators 109 and 110. The conductors 105 and 108 are adapted to be contacted by the trolley wheels 34 and 35 and when the trolley wheel 34 contacts these conductors, control impulses are received by the conveyor and through suitable discriminating apparatus to be described, the conveyor is stopped at the desired one of the stations C and D. Similarly at stations E and F on the branch trackway 13 there are generators 112 and 113. The generator 112 is connected to a control section including a control conductor 114 which is associated with the bus bar 41 and is insulated therefrom by the insulators 115 and 116. The generator 113 is connected to a control section including a control conductor 117 also associated with the bus bar 41 and insulated therefrom by means of the insulators 118 and 119. The conductors 114 and 117 are adapted to be contacted by the trolley wheels 34 and 35 and when contacted by the trolley wheel 34 an impulse is received by the conveyor and through discriminating apparatus the conveyor is controlled to stop at the desired one of stations E and F.

The control box 29 mounted on the conveyor 21 includes a motor controller 121, a frequency generator 122, a discriminator or receiver 123 as well as the choke coils 124 and 125, connected, respectively, between the current-collecting trolleys 32 and 33 and 34 and 35 and the condensers 126 and 127 connected together and grounded at one of their terminals and connected to the midpoints of the choke coils 124 and 125 at their other terminals. The function of the choke coils and the condensers will be indicated more completely throughout the specification. The motor controller 121 controls the forward and reverse movements of the conveyor propulsion motor 28, the frequency generator 122 co-operates with the discriminators 82 and 91 to control the movements of the track switches 14 and 15, and the receiver 123 co-operates with the generators 103, 104, 112 and 113 to control the stopping of the conveyor.

Referring more particularly to Fig. 2, there is disclosed the circuit elements of the discriminator 82 associated with the track switch 14 adjacent station A and the conveyor 21 with the frequency generator 122 in order to more completely describe the means for operating the track switch 14. The frequency generator 122 is mounted on the conveyor 21 and comprises an alternating current generator 128 which is capable of generating a range of frequencies varying from one thousand to three thousand cycles per second, for example, depending on its speed of rotation. While the generator 128 has been shown as a piece of rotating machinery it will be understood that an electron tube circuit may be used, for example, the well known Hartley oscillator. The generator 128 has one of its terminals grounded, as shown, and the other terminal is connected through conductors 130 and 206 to the trolley wheel 32. The generator 128 is adapted to be driven by a single phase alternating current motor 131 which may be of the repulsion type for simple speed control. Power is supplied to the motor 131 from the source $L_1$ and $L_2$, a resistance 132 being connected in series with the line $L_2$. The resistance 132 has a plurality of connecting positions $a$, $b$, and $c$ so that the line $L_2$ may be connected to any one of the three positions in order to determine the speed of the motor 131 and consequently the frequency generated by the generator 128. When the source $L_2$ is connected to the point $a$ the speed of the motor and consequently of the generator may be such as to generate a frequency of one thousand cycles per second. When the source $L_2$ is connected to the point $b$, the speed of the motor will be such that the generator will generate a frequency of two thousand cycles per second and when the line $L_2$ is connected to the point $c$, the generator will generate a frequency of three thousand cycles per second.

The discriminator 82 is a frequency responsive device which becomes effective when the generator 128 is connected thereto by the current-collecting trolley provided the generator is supplying the frequency to which the discriminator is responsive and is a trigger circuit comprising a tuned circuit including the inductance 133 and the condenser 134 connected in series with each other and an electron tube 137 adapted to be triggered by the voltage in the tuned circuit when resonating. One side of the condenser is connected through conductors 135 and 135a to the control conductor 83 and one side of the inductance 133 is connected through the conductor 136 to ground or $L_3$. The inductance 133 and the condenser 134 form a series circuit which is resonant to one of the frequencies generated by the generator 128, for example, the frequency of one thousand cycles per second, and is normally isolated and unenergized since the conductor 135 is connected to the control conductor 83 which is insulated from the bus bar 36. Whenever the circuit of the inductance 133 and the condenser 134 is energized with the frequency corresponding to its resonant frequency, a high voltage appears across each of the inductance 133 and the condenser 134 which is made use of to effect energization of the coil 81 for closing the contacts 80 of the relay 77 by triggering the tube 137.

The electron tube 137 which is of the cold cathode glow discharge type having a cathode 138, a grid or starter anode 139 and a plate 140 when fired or triggered by a proper voltage applied to its grid products a surge of current to operate the relay 77. The cathode 138 is connected to ground and to one side of the inductance 133 through the conductors 143 and 136, while the plate 140 is connected to the control conductor 83 through a circuit including the conductor 144, the conductor 145, the coil 81, the conductor 146, the conductor 147, the resistor 148 and the conductor 135a. Thus the coil 81 is in a series circuit with the plate 140 and the cathode 138. Connected between the conductor 136 and the conductors 135 and 135a are the resistors 148 and 151, the conductor 147 being connected to the juncture of these two resistors. By varying the resistance of the resistors 148 and 151 the voltage applied between the cathode 138 and the plate 140 may be fixed at a desired value.

In order to trigger or fire the tube 137 the grid 139 is connected to the juncture of the inductance 133 and condenser 134 through a circuit including the resistor 152, the resistor 154 and the conductor 156 and connected to the juncture of the resistors 152 and 154 is the resistor 153 having its other end connected to the inductance 133 and ground through the conductor 155. The resistors 153 and 154 constitute a potentiometer and thus by varying the resistance of these resistors any portion of voltage appearing across the inductance 133 may be applied to the grid 139. Even though voltage is applied to the plate 140 of the tube 137 there will be no current flow through the tube unless the triggering voltage is first applied to the grid 139 and it is well known that in tubes of the type disclosed after the tube has begun to conduct the current continues to flow until the voltage is removed from the plate. Accordingly, when the conveyor moves by the control conductor 83 and the generator 128 is generating a frequency which is not the resonant frequency of the inductance and condenser 133 and 134, even though the voltage of this frequency as well as the voltage of the bus bar 36 is applied to the condenser and inductance through the current collector 32, the tube 137 will not conduct current because there is insufficient voltage applied to the grid 139. However, when the generator 128 has been adjusted to generate a frequency equal to the resonant frequency of the inductance 133 and condenser 134 and the current collector 32 contacts the control conductor 83, a high voltage appears across the inductance 133 and, accordingly, a high voltage is applied to the grid 139 and the tube 137 conducts current which flows through the coil 81 energizing it to close the contacts 80 and thereby effect movement of the track switch 14 as will be subsequently described. The choke coils 124 and 125 have a high impedance to high frequencies and a lower impedance to low frequencies, and the condensers 126 and 127 have a low impedance to high frequencies and a higher impedance to low frequencies. Accordingly, the frequency generated by the generator 128 tends to leak to ground through a portion of the coil 124 and the condenser 127 (the frequency of generator 128 is of an intermediate value as will be pointed out). Thus the circuit to the control conductors of the frequency discriminators is completed effectively when the rear collector 32 contacts the control conductors of the various discriminators, for example control conductor 83, at which time the circuit from generator 128 to the discriminators extends directly from conductor 206 through current collector 32 without extending through choke coil 124. However, the impedance of coils 124 and 125 is sufficiently low for the power frequency so as to offer a low impedancy to this frequency. The voltage of the generator 128 is applied to the inductance 133 and the condenser 134 through the circuit extending from generator 128, through conductors 130 and 206, current collector 32, conductors 135a and 135, condenser 134, inductance 133, and conductor 136 to ground. The condenser 157 is connected in parallel with the coil 81 in order to smooth out the voltage fluctuations applied to the coil since the tube 137 passes only half wave impulses. The voltage applied to the plate of the tube is the voltage existing between the lines $L_1$ and $L_3$ of the three-phase system and is applied to the plate of the tube through a circuit extending from the bus bar 36, the current collector 33, the choke coil 124, the current collector 32, control conductor 83, conductor 135a, the resistor 148, conductors 147 and 146, the relay coil 81, conductors 145 and 144, plate 140, and the cathode 138, through the conductor 143 to ground which also corresponds to $L_3$. In other words, the power on the bus bars for the conveyor propulsion motor is also used to supply voltage to the plate circuit of the tube 137 while the higher frequency voltage of the generator 128 is used to actuate the tube 137.

The discriminator 91 is substantially identical in its circuit elements to the discriminator described in Fig. 2 and differs therefrom mainly in that the inductance and the condenser forming the resonant circuit and corresponding to the inductance 133 and the condenser 134 of Fig. 2 are of such a value that the resonant frequency of the circuit in the discriminator 91 differs from the resonant frequency of the circuit in Fig. 2. For example, the resonant frequency of the discriminator 91 may be two thousand cycles per second so that when the conveyor moves by it and the current collectors contact the control conductor 92, the discriminator 91 will not function if the frequency generator on the conveyor is generating one thousand cycles per second, but it will respond and cause the contacts 87 to be closed when the frequency being generated by the generator 128 is two thousand cycles per second. It is well understood that a series circuit tuned to resonate at one frequency will conduct a very much smaller fraction of current when a frequency of one half the resonant frequency is applied to it.

Referring now to Fig. 3 of the drawings, the conveyor is shown with all of the apparatus mounted thereon in a position after having moved through the track switch 14 in the curved position so that the conveyor is moving on the branch trackway 12.

The conveyor 21 is moved along the trackways by means of a propulsion motor 28 which has power supplied to it through the conductors 160 and 161 from the current collectors 30 and 31 including the trolleys 32, 33 and 34, 35. In order that the flow of power to the motor 28 is not interrupted by the control sections which include control conductors and insulators separating them from the bus bars the spacing of the trolleys 32 and 33 and 34 and 35 is such that the trolleys span over the control sections and are therefore in contact with the bus bars at all times. To control the flow of power to the motor 28 the relays 162 and 163 are provided, the relay 162 controlling the motor to run in the forward direction and the relay 163 controlling the motor to operate in the reverse direction. Since the motor 128 is a three-phase motor, it is only necessary to reverse any two of the motor power leads to reverse its direction of operation and since one of the three-phase terminals is grounded, as shown, the relays 162 and 163 act to reverse the connections from the current collectors 32 and 34 to the conductors 160 and 161. The relay 162 is of a type well known in the art and comprises a pair of contacts 164 and 165 adapted to be operated by a coil 166. The contacts 164 and 165 are normally open and remain closed only so long as the coil 166 is energized. The relay 163 is substantially identical with the relay 162 and includes the normally open contacts 169 and 167 adapted to be closed by the coil 168. The contacts 169 and 167 also are closed only so long as the coil 168 is energized.

In order that the contacts of relay 162 may be held closed so that the conveyor will move forward along the trackways without supervision, the mechanically held or latching relay 170 is associated with the relay 162. The relay 170 comprises a pair of contacts 171 adapted to be closed through the actuation of an over-center toggle mechanism 172 and two solenoids 173 and 174 arranged with their movable cores on opposite sides of the toggle mechanism 172, the cores being biased away from the toggle mechanism as shown. Whenever the coil 173 is energized the toggle mechanism 172 is straightened to close the contacts 171 to thereby maintain the relay 162 in the picked-up position and whenever the coil 174 is energized the over-center mechanism 172 is tripped to deenergize the relay 162. The opening coil 174 of the relay 170 may be energized through a stop push button 175 or it may be energized by means of the receiver 123. To actuate the conveyor to move forwardly without the control of an operator, the contacts of the automatic push button 176 are closed, and to control the conveyor to move forwardly or rearwardly in small amounts the forward and reverse push buttons 177 and 178 are provided. The toggle mechanism of relay 170 is tripped automatically so that the conveyor will stop at the desired point, for example the station C, by energizing the coil 174 by means of the relay 180 which includes the contacts 181 and the operating coil 182. The coil 182 is adapted to be energized by means of the discriminator or receiver 123 whereby this coil can be energized only when desired.

The receiver 123 is a trigger circuit comprising an electron tube 187 and a resonant circuit including the inductance 183 and one of the condensers 184, 185 and 186 connected in series across $L_2$ and $L_3$ or ground to control the electron tube. Whenever the series circuit is supplied with a voltage having the frequency corresponding to the resonant frequency of the circuit, a high voltage will appear across the inductance 183 which high voltage is used to energize the coil 182 as will now be explained. The electron tube 187 is of the cold cathode glow discharge type having a cathode 190, a grid 191 and a plate 192. Normally a tube of this type is non-conductive even though a voltage is applied to its plate and the tube begins to conduct only when a voltage of proper value is applied to its grid. The coil 182 is mounted in the plate circuit of the tube 187 in order that the coil may be energized through the circuit extending from bus bar 38 or $L_2$, current collectors 34 and 35, conductor 211, resistor 193, conductor 194, coil 182, conductor 195, through the tube 187, conductor 196 to ground or $L_3$. While the circuit described is complete and the voltage from $L_2$ to ground is applied to it there is no current flowing therein since the tube 187 is non-conducting. The resistor 193 is connected to a resistor 197 which has its other end connected to ground or $L_3$ and the conductor 194 is connected to the juncture of the resistors 193 and 197 so that any proportion of the voltage existing between the lines $L_2$ and $L_3$ may be applied to the plate 192 of the tube. The grid 191 of the tube is connected to a resistor 200 which is connected to the juncture of the two resistors 201 and 202 having their other ends connected, respectively, to the juncture between the inductance 183 and one of the condensers 184, 185 and 186 and $L_3$ or ground. The resistors 201 and 202 form a potentiometer so that any desired portion of the voltage existing across the inductance may be applied to the grid 191. Thus whenever a frequency of proper value is applied to the receiver, such as when the collector 34 contacts the control conductor 105, the circuit including one of the condensers 184, 185 and 186, and the inductance 183 resonates and a portion of the high voltage appearing across the inductance is applied to the grid 191. Consequently the tube 187 breaks down and conducts current whereby the coil 182 is energized and closes the contacts 181 which in turn energizes the coil 174 to trip the over-center mechanism 172.

The voltage of the proper frequency to place the various circuits of the receiver 123 into resonance is supplied by the various generators 103, 104, 112 and 113. In Fig. 3 only the generator 104 at station D is illustrated and comprises a small single-phase motor 203 adapted to be energized from the lines $L_1$ and $L_3$ and a single-phase generator 204 driven by the motor to generate a frequency having a value far removed from the frequencies of the generator 128 such as, for example, ten thousand cycles per second. As indicated for the generator 128, the generators 103, 104 and 112, 113 may be electron tube oscillators such, for example, as the Hartley oscillator. One terminal of the generator is connected to $L_3$ or ground and the other terminal is connected through a conductor 205 to the control conductor 108. Since the conductor 108 is insulated from the bus bar 41, the frequency generated by the generator 204 is normally isolated from the bus bar 41 and, therefore, cannot hinder the operation of any frequency responsive apparatus at the other points throughout the system. The generators 103, 112 and 113 are identical with the stop impulse generator 104 except that the frequency generated by the generator 103 differs from that generated by the generator 104 by a sufficient amount so that the receiver circuit 123 will be energized only by the proper one of the generators. Thus the frequency generated by the generator 103 may have a value of twenty thousand cycles per second. Since the generators 112 and 113 are in a different branch trackway, these generators may generate frequencies equal to those generated by the generators 103 and 104, respectively, or they may have frequencies entirely different. It is necessary that the frequency generated by each of the generators corresponds to the resonant frequency of one of the circuit combinations of the inductance 183 and the condensers 184, 185 and 186 and that the frequencies differ from each other sufficiently so that a circuit arranged to respond to one frequency will not respond to another one.

With the foregoing description of structure in mind, the remainder of the structure and the operation of the system may best be set forth by considering the different aspect of the system as predeterminedly controlled conveyors move through it.

The first type of operation is that of a conveyor moving along the trunk trackway 11 and having its final position predetermined so that it will stop at station D. This requires that the track switch 14 be moved so that the trackway 16 registers with the trackways 11 and 12 and further that the conveyor move past station C without stopping. The discriminator 82 has its resonant circuit tuned so that it will resonate to a frequency of one thousand cycles per second and, accordingly, the generator 128 on the conveyor 21 is set to generate a frequency of one thousand cycles per second. The generators 104 and 103 are assumed to be generating respectively ten thousand and twenty thousand cycles per second and the receiver 123 has its resonant circuit made of inductance 183 and condenser 185 which resonates at a frequency of ten thousand cycles per second.

To start the conveyor moving, the operator pushes the automatic start button 176 (Fig. 3) closing the circuit extending from L₁ or bus bar 36 (Fig. 1) through the current collector 32, the conductor 206, the contacts of push button 176, coil 173 of relay 170, conductor 207, conductor 208, conductor 209, conductor 211, current collector 34 to the bus bar 37 (Fig. 1). This circuit energizes the coil 173 which actuates the over-center mechanism 172 thereby closing the contacts 171. Closing the contacts 171 energizes the coil 166 through a circuit extending from bus bar 36 through the current collector 32, conductor 206, conductor 212, closed contacts 171, conductor 213, coil 166, conductor 214, conductor 208, conductor 209, conductor 211, and current collector 34 to bus bar 37. Energizing the coil 166 picks up the relay 162 and closes the contacts 164 and 165 and since the relay 170 is mechanically latched the contacts 164 and 165 are maintained closed. Closing the contacts 164 and 165 supplies power to the motor 28 through a circuit extending from bus bar 36 through current collector 32, conductor 206, conductor 215, conductor 216, closed contacts 165, conductor 161 to the motor and from bus bar 37 through current collector 34, conductor 211, conductor 209, closed contacts 164 and conductor 160 to the motor 28. The motor is thereby energized by connecting the conductors 206 and 161 and conductors 211 and 160 to run in the forward direction.

As the conveyor moves forward and the current collector 32 contacts the control conductor 83, the frequency generated by the generator 128 is supplied to the discriminator 82 through a circuit extending from the generator 128 through conductor 130, conductor 206, current collector 32, control conductor 83 and conductor 135a. Since the frequency being supplied by the generator 128 corresponds to the resonant frequency of the inductance 133 and condenser 134, the tube 137 of discriminator 82 fires as already explained and supplies current to the coil 81 which picks up the relay 77 and closes the contacts 80 momentarily. Whenever the current collector 32 moves off of the control conductor 83, the tube 137 of the discriminator 82 becomes de-energized and the relay contacts 80 open. Closing the contacts 80 energizes the coil 51 of the relay 46 through a circuit extending from L₁, through closed contacts 80, conductor 217, coil 51 and conductor 218 to L₂ and effects closing of the contacts 48, 49 and 50. Closing the contacts 48 establishes a holding circuit for the coil 51 which extends from L₁ through closed contacts 48, conductor 219, the closed contacts of limit switch 57, conductor 217 through coil 51 and conductor 218 to L₂. Thus when the current collector 32 moves off of the control conductor 83 the relay 46 remains in its picked-up condition. Through the closed contacts 49 and 50 power is supplied to the operating motor 43 of the track switch 14 through a circuit extending from L₁ through the closed contacts 49, conductor 221, conductor 222 to the motor 43 and from L₂ through closed contacts 50, conductor 223 and conductor 224 to the motor 43. The motor 43 is grounded, as shown for connection to L₃ which is also grounded. The conductors 222 and 224 leading to the motor are thus connected, respectively, to L₁ and L₂ to drive the motor 43 in a direction to move the track switch from the normal position shown to that where the trackway 16 registers with the trackways 11 and 12. As the track switch moves toward the position indicated the limit switch 56 closes its contacts and when the track switch reaches its final position the limit switch contacts 57 are opened thereby de-energizing the coil 51 which effects opening of the contacts 48, 49 and 50 thereby stopping the motor 43.

The conveyor now moves over the curved trackway 16 and onto the trackway 12, as shown in Fig. 3. When the conveyor has moved completely off of the trackway 16 the current collector 33 will contact the control conductor 95 which effects energization of the coil 55 of the relay 47 to cause the track switch to move to its normal position. The coil 55 is energized through a circuit extending from L₁ or bus bar 39 through the current collector 32, choke coil 124, current collector 33, control conductor 95, conductor 225, conductor 226, coil 55 and conductor 218 to L₂. Since the conveyor is moving the current collector 33 contacts the control conductor 95 momentarily and the coil 55 is energized only momentarily. However, energizing the coil 55 closes the contacts 52, 53 and 54 and closing contacts 54 establishes a holding circuit for the coil 55 from L₁ through conductor 227, closed contacts 54, conductor 228, closed contacts of the limit switch 56, conductor 226, coil 55 and conductor 218 to L2. The closed contacts 52 and 53 establish a circuit to the track switch motor 43 from L1 through conductor 228, closed contacts 52, conductor 224 to the motor 43 and from L2 through conductor 229, closed contacts 53 and conductor 222 to the motor 43. The third connection to the motor is the ground connection. Therefore, the leads 222 and 224 are connected to L2 and L1, respectively, to drive the motor 43 in the reverse direction to move the bridge trackway back to the normal position where the trackway 15 registers with the trunk trackway 11. When the track switch reaches this position the limit switch contacts 56 are opened thereby interrupting the circuit to the coil 55 and effecting opening of the contacts 52, 53 and 54. Accordingly, the motor 43 stops and the bridge trackway is in position for the next conveyor to pass through.

In this phase of operation the conveyor is predetermined to stop at station D and, accordingly it moves past station C without stopping as will be made clear. When the current collector 35 contacts the control conductor 105 the frequency being generated by the generator 103 of twenty thousand cycles per second is applied to the choke coil 125. The choke coils 125 and 124 are designed in a manner well understood by those skilled in this art, to prevent substantially all of the frequency of twenty thousand cycles per second from passing through the choke coil 125 to the current collector 34 and the bus bar 38 while permitting the power frequency of sixty cycles per second, for example, to pass without hindrance. Any small amount of the twenty thousand cycle frequency which does get through the first part of the choke coil from the current collector 35 is by-passed through the condenser 126 to ground, the condensers 126 and 127 having a low impedance to high frequency and a high impedance to low frequencies. Therefore, the frequency of twenty thousand cycles per second is prevented from reaching the current collector 34, is kept from the bus bars, and consequently can not affect any apparatus at other points in the system. When the current collector 34 contacts the control section 105, the choke coil and the condenser again prevent the twenty thousand cycle frequency from reaching the bus bars in the manner just described. However, this frequency is supplied to the receiver 123 from the generator 103 through the control conductor 105, the current collector 34, and the conductor 211. The resonant circuit of the receiver 123 (inductance 183 and condenser 185) has been set to be resonant to ten thousand cycles per second and accordingly it does not respond to develop a high voltage and even though voltage is being supplied to the plate of tube 187, as previously described, the tube will not fire since there is insufficient voltage on the grid 191. Therefore, no control impulse is received by the relay coil 182 and the conveyor moves by station C.

As the conveyor approaches station D where it is to stop the current collector 35 contacts the control conductor 108 (Fig. 3, collector 35 shown dotted). The frequency generated by the generator 204 at station D ten thousand cycles per second can not reach the current collector 34 or the conductor 211 since the choke coil 125 has been designed to prevent this frequency from being passed and whatever portion has a tendency to pass through the choke coil will be by-passed by the condenser 126 to ground. When the current collector 34 contacts the control conductor 108 (Fig. 3, collector 34 shown dotted) the ten thousand cycle frequency is again prevented from reaching the bus bar 38 by virtue of the choke coil 125 and the condenser 126, but is supplied through the control conductor 108, the current collector 34, the conductor 211 to the receiver 123. While the frequency of ten thousand cycles is not passed by the choke coils the power supply frequency of sixty cycles is passed without hindrance as indicated. The resonant circuit in the receiver, the inductance 183 and the condenser 185, is tuned to resonate at the frequency of ten thousand cycles and accordingly the grid 191 of the tube 187 has a high voltage impulse applied to it and the tube fires supplying a current impulse to the coil 182. The coil 182 effects closing of the contacts 181 thereby energizing the opening coil 174 of the relay 170 through a circuit extending from the current collector 32, conductor 206, contacts 181, conductor 231, coil 174, conductors 207, 208, 209 and 211 to the current collector 34 and bus bar 38. Energizing the coil 174 trips the over-center mechanism 172 which opens the contacts 171 and deenergizes the coil 166, the relay 162 thereby disconnecting the motor 128 and stopping the conveyor at station D. The conveyor has sufficient momentum of its own to move past the control conductor 108 so that the energization of the receiver 123 is removed. To start it again the operator determines by means of the receiver 123 at which point the conveyor is next destined to stop whereupon the operator pushes the automatic forward switch 176 and the conveyor begins its travel again.

In the event that it is desired to stop the conveyor at a point other than at a control station, the operator need only push the stop switch 175 which will also energize the coil 174 through a circuit extending from the current collector 32 through conductor 206, push button switch 175, conductor 231, coil 174, conductors 207, 208, 209 and 211 to the current collector 34. The relay contacts 171 are opened as already described and the conveyors stop.

If it is necessary to move the conveyor forward a small amount, i. e., inching forward, the push button switch 177 is closed energizing the coil 166 of relay 162 through a circuit extending from bus bars corresponding to L1 through current collector 32, conductor 206, switch contacts 177, conductor 232, coil 166, conductors 214, 208, 209 and 211 to current collector 34, and bus bars corresponding to L2 to supply the motor 28 only so long as the switch 177 is held closed. To inch the conveyor in the reverse direction the push button switch 178 is closed to energize the coil 168 of the relay 163 through a circuit extending from current collector 32, conductor 206, closed contacts of switch 178, conductor 233, coil 168, conductors 214, 208, 209 and 211 to current collector 34. Energizing the coil 168 closes the contacts 166 and 167 which supplies power to the motor 28 through a circuit extending from current collector 32, conductor 206, conductor 215, conductor 234, closed contacts 167, conductor 235, conductor 160 to the motor and from the current collector 34 through the conductors 211, 209, 208, 236, closed contacts 169, conductor 237 and conductor 161 to the motor 28. The ground connection of the motor is the third connection. The motor 28 accordingly runs in the reverse direction since the conductors 160 and 161 have been connected to the conductors L1 and L2 instead of to L2 and L₁. As soon as the switch 178 is open the reverse movement of the conveyor stops.

The second major type of operation occurs when the conveyor is predetermined to move past station A and turn at station B to stop at station E on the trackway 13. This means that the track switch 17 must be caused to move from the normal position shown to that wherein the trackway 19 registers with the trackways 11 and 13. To effect this operation the generator 128 on the conveyor is driven at a speed by the motor 131 to generate a frequency of two thousand cycles per second, for example, and the generator 112 at station E is generating a frequency of twenty thousand cycles per second. Therefore, when in its movement the current collector 32 contacts the control conductor 83 adjacent station A, the discriminator 82 does not become operative since its resonant circuit is tuned to resonate at one thousand cycles per second. Therefore, the track switch 14 remains in the position shown and the conveyor moves through on the trackway 15 and approaches station B.

As the current collector 32 contacts the control conductor 92 adjacent station B the frequency of two thousand cycles being generated by the generator 128 is supplied through the conductors 130 and 206, the current collector 32, the control conductor 92 and through conductor 238 to the discriminator 91. The discriminator has a resonant circuit and an electron tube circuit identical with that of discriminator 82, except that the resonant circuit is tuned to resonate at two thousand cycles per second. Therefore, when the current collector 32 strikes the control conductor 92 the discriminator 91 becomes effective to energize the coil 88 of the relay 86 and close the contacts 87 momentarily. Closing the contacts 87 energizes the coil 70 of relay 64 through a circuit extending from L₁ through closed contacts 87, conductor 240, coil 70 and conductor 241 to L₂ and effects closing the contacts 66, 67 and 68. The closed contacts 66 complete a holding circuit for the coil 70 from L₁ through closed contacts 66, conductor 239, closed contacts of the limit switch 75, conductor 240, coil 70 and conductor 241 to L₂. Therefore, when the current collector 32 has moved off of the control conductor 92 the relay 64 remains in its picked-up position. The closed contacts 67 and 68 supply power to the motor 61 to shift the track switch 17 from the normal position shown to that where the trackway 19 registers with the trackways 11 and 13 through the following circuit: From L₁ through closed contacts 67, conductor 242, conductor 243 to the motor 61 and from L₂ through closed contacts 68, conductor 244 and conductor 245 to the motor 61. The ground connection at the motor makes the third connection and accordingly the motor runs in the direction to shift the track switch 17 to its curved position. As the track switch moves the contacts of the limit switch 76 close and when it reaches the final position where the trackway 19 registers with the trackway 11, the contacts of the limit switch 75 are opened interrupting the holding circuit to the coil 70 previously described. This opens the contacts 66, 67 and 68 and stops the motor 61.

The conveyor moves through the switch on the trackway 19 and after having moved completely through it the current collector 33 contacts the control conductor 98 which effects actuation of the relay 65 to supply power to the motor 61 to drive the track switch from its curved position to the normal position where the trackway 18 registers with the trackway 11. The relay 65 is actuated to close the contacts 71, 72 and 73 by energizing the coil 74 through a circuit extending from L₁, bus bar 42, current collector 32, choke coil 124, current collector 33, control conductor 98, conductor 246, conductor 247, coil 74 and conductor 241 to L₂. Closing the contacts 73 completes a holding circuit for the coil 74 as follows from L₁ through conductor 248, closed contacts 73, conductor 249, closed contacts of limit switch 76, conductor 247, coil 74 and conductor 241 to L₂. Accordingly, the relay 65 remains picked up after the current collector 33 moves off of the control conductor 98. Closing the contacts 71 and 72 supplies power to the motor 61 through a circuit extending from L₁ through conductor 248, closed contacts 71, conductor 245 to the motor 61 and from L₂ through conductor 251, closed contacts 72 and conductor 243 to the motor 61. The ground connection at the motor completes the three-phase circuit. The conductors 243 and 245 are connected to L₂ and L₁, respectively, whereby the motor 61 runs in the reverse direction to move the track switch back to the normal position. When this position is reached the contacts of the limit switch 76 are opened interrupting the holding circuit of the coil 74 thereby effecting opening of the contacts 71, 72 and 73 and as a result stopping the motor 61.

As the conveyor moves along the trackway 13 its current collector 35 contacts the control conductor 114 which is connected to the stop generator 112 at station E. The generator at station E is constructed to generate a frequency of twenty thousand cycles per second. Since the conveyor is predetermined to stop at station E the receiver 123 on the conveyor has its resonant circuit comprised of inductance 183 and condenser 184 which combination forms a circuit resonating at twenty thousand cycles per second. As previously described for station D, when the current collector 35 contacts the control conductor 114, the frequency of twenty thousand cycles is prevented from reaching the bus bars by means of the choke coil 125 and the condenser 126, and when the current collector 34 contacts the control conductor 114, the twenty thousand cycle frequency is also isolated from the bus bars but the frequency is supplied through the control conductor 114 and the current collector 34 to the resonant circuit (inductance 183 and condenser 184) of the receiver which responds to trigger the tube 187 to energize the coil 182 which closes the contacts 181 of relay 180 (Fig. 3). Closing the contacts 181 energizes the coil 174 of the mechanically held relay 170 through a circuit already described and trips the over-center mechanism 172 opening the contacts 171 thereby deenergizing the contactor 165 supplying power to the conveyor motor 28. The conveyor accordingly stops, its momentum carrying it beyond the control conductor 114. If it should be desired that the conveyor move to station F instead of station E it is only necessary to combine the inductance 183 and the condenser 186 on the receiver 123 so that this resonant circuit responds to the frequency being generated at station F which may be thirty thousand cycles per second, for example.

The third instance of operation is one in which it is predetermined that a conveyor should move through both stations A and B and continue on the trunk trackway 11 to stop at some other station not shown. To effectuate this condition the generator 128 on the conveyor is caused to rotate at a speed such that it produces a frequency of three thousand cycles, for example. Therefore, as the conveyor approaches station A the discriminator 82 will not function since it responds to a frequency of one thousand cycles per second. The conveyor moves on and as it approaches station B the discriminator 91 also refuses to function since it responds to a frequency of two thousand cycles per second. Accordingly, the conveyor continues to move on the trunk trackway 11 until it reaches another station where the discriminator responds to a frequency of three thousand cycles per second.

It will be clear that more than two stop stations on each branch trackway may be provided and the conveyor controlled to stop at such additional stations in a manner substantially identical with those described for stations D and E.

The conveyor system has been described with three ranges of frequencies, a low frequency for power purposes which may be sixty cycles per second or fifty cycles per second, for example, a higher range of frequencies which may be frequencies of the order of one thousand cycles per second to control the movement of the track switches, and a third range of frequencies higher than the second and which may be multiples of ten thousand cycles per second to control the stopping of the conveyor. The frequencies for controlling the movement of the track switches are applied from a generator on the conveyor to the current collectors 32 and 33 and accordingly are applied to the bus bars. Therefore, this range of frequencies is received by other apparatus throughout the system but since the power involved is small, even though it may be received by the conveyor propulsion motors, for example, no ill effects result. Since the frequencies generated by the generators on the conveyors are of the order of one thousand cycles and multiples thereof, insufficient currents from these generators pass through the motor windings on the coils 124 and 125 to produce false operation. Thus in one instance of operation a conveyor destined for trackway 13 may have its collector 32 on control conductor 83 and following immediately behind this conveyor there may be a second conveyor destined for trackway 12. Under these conditions a circuit is completed from the one thousand cycle generator of the following conveyor through one-half of the choke coils 124 and 125 of the following conveyor through the propulsion windings thereof through one-half of the coils 124 and 125 of the advanced conveyor whose collector 32 is on the conductor 83 and through the motor windings of the propulsion motor thereof. Since the propulsion motors are designed to operate on power frequencies, as for example, sixty cycle power, the windings of these motors present a very high impedance to the control frequencies of one thousand cycles or greater. The combined impedances of the coils 124 and 125 and the motor windings prevent current from the one thousand cycle generator on the following conveyor from passing therethrough in sufficient magnitude to produce a sufficient voltage drop across the resistor 151 to cause discharge or firing of the tube 137. Accordingly, a following conveyor destined for trackway 12, for example, cannot cause a false operation of the switch 14 through the circuits of an advance conveyor destined for another trackway. In addition to the presence of the high impedance elements in the indirect circuit discussed above, the condensers 125 and 126 on each conveyor form grounding circuits which would greatly reduce the magnitude of the undesired current which might otherwise pass through such indirect circuit. The conveyor stopping apparatus responds only to frequencies above ten thousand cycles per second, for example, and therefore will be unaffected by the lower range of frequencies on the bus bars which is used to move the track switches. The conveyor stopping frequencies (third range) are isolated from the system bus bars first, by the insulated control conductors, such as conductor 108 and second, by the choke coils connected between the current collector trolleys and, therefore, conveyors throughout the system other than the one intended to be stopped remain unaffected. The power in the third range of frequencies is also small and accordingly produces no ill effects when it is received by the conveyor propulsion motor.

While a particular embodiment of the invention has been shown it will be understood, of course, that the invention is not limited thereto since many modifications may be made, and it is, therefore, contemplated by the appended claims to cover any such modifications as come within the true spirit and scope of the invention.

Having thus described the invention, what is claimed and desired to be secured by Letters Patent is:

1. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to and insulated from said power bus bar, spaced control collector means carried by said conveyor and guided to engage said power bus bar substantially continuously and to engage said interposed bus bar means sequentially as the collector means travel, a plurality of distinguishable circuit means having differing resonance characteristics located adjacent said stations and having first ends thereof electrically connected one each to respective ones of said bus bar means, conveyor borne circuit means including manually adjustable means for adjusting the resonance characteristics thereof electrically connected at one end to said collector means, the opposite ends of said distinguishable circuit means being electrically connectable to the opposite end of said conveyor borne circuit means whereby a resonant control circuit may be established including said conveyor borne circuit means and only the circuit means of a selected station and only upon engagement of the collector means with the bus bar means of the selected station, and means included in said control circuit operably responsive only to a resonant condition within said circuit to control an operation affecting the conveyor at the selected station.

2. A conveyor for travelling along a trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to and insulated from said power bus bar, spaced control collector means carried by said conveyor and guided to engage said power bus bar substantially continuously and to engage said interposed bus bar means sequentially as the collector means travel, a plurality of distinguishable circuit means having differing resonance characteristics located adjacent said stations and having first ends thereof electrically connected one each to respective ones of said bus bar means, conveyor borne circuit means including manually adjustable means for adjusting the resonance characteristics thereof electrically connected at one end to said collector means, the opposite ends of said distinguishable circuit means being electrically connectable to the opposite end of said conveyor borne circuit means whereby a resonant control circuit may be established including said conveyor borne circuit means and only the circuit means of a selected station and only upon engagement of the collector means with the bus bar means of the selected station, and means included in said control circuit operably responsive only to a resonant condition within said circuit to control an operation affecting the conveyor at the selected station.

3. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to and insulated from said power bus bar, spaced control collector means carried by said conveyor and guided to engage said power bus bar substantially continuously and to engage said interposed bus bar means sequentially as the collector means travel, a plurality of distinguishable circuit means having differing resonance characteristics located adjacent said stations and having first ends thereof electrically connected one each to respective ones of said bus bar means, conveyor borne circuit means including manually adjustable means for adjusting the resonance characteristics thereof electrically connected at one end to said collector means, the opposite ends of said distinguishable circuit means being electrically connectable to the opposite end of said conveyor borne circuit means whereby a resonant control circuit may be established including said conveyor borne circuit means and only with the circuit means of a selected station and only upon engagement of the collector means with the bus bar means of the selected station, and means included in said control circuit operably responsive only to a resonant condition within said circuit to control an operation affecting the conveyor at the selected station, said circuit means connected to said collector means comprising a source of A. C. power of adjustable frequency and said circuit means connected to said bus bar means comprising reactive elements of differing reactive value.

4. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to and insulated from said power bus bar, spaced control collector means carried by said conveyor and guided to engage said power bus bar substantially continuously and to engage said interposed bus bar means sequentially as the collector means travel, a plurality of distinguishable circuit means having differing resonance characteristics located adjacent said stations and having first ends thereof electrically connected one each to respective ones of said bus bar means, conveyor borne circuit means including manually adjustable means for adjusting the resonance characteristics thereof electrically connected at one end to said collector means, the opposite ends of said distinguishable circuit means being electrically connectable to the opposite end of said conveyor borne circuit means whereby a resonant control circuit may be established including said conveyor borne circuit means and only the circuit means of a selected station and only upon engagement of the collector means with the bus bar means of the selected station, and means included in said control circuit operably responsive only to a resonant condition within said circuit to control an operation affecting the conveyor at the selected station, said circuit means connected to said collector means comprising reactive means of adjustable reactive value.

5. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to and insulated from said power bus bar, spaced control collector means carried by said conveyor and guided to engage said power bus bar substantially continuously and to engage said interposed bus bar means sequentially as the collector means travel, a plurality of distinguishable circuit means having differing resonance characteristics located adjacent said stations and having first ends thereof electrically connected one each to respective ones of said bus bar means, conveyor borne circuit means including manually adjustable means for adjusting the resonance characteristics thereof electrically connected at one end to said collector means, the opposite ends of said distinguishable circuit means being electrically connectable to the opposite end of said conveyor borne circuit means whereby a resonant control circuit may be established including said conveyor borne circuit means and only the circuit means of a selected station and only upon engagement of the collector means with the bus bar means of the selected station, and means included in said control circuit operably responsive only to a resonant condition within said circuit to control an operation affecting the conveyor at the selected station, said circuit means connected to said collector means comprising reactive means of adjustable reactive value, and said circuit means connected to said bus bar means comprising a source of A. C. power of differing frequencies.

6. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to and insulated from said power bus bar, spaced control collector means carried by said conveyor and guided to engage said power bus bar substantially continuously and to engage said interposed bus bar means sequentially as the collector means travel, a plurality of distinguishable circuit means having differing resonance characteristics located adjacent said stations and having first ends thereof electrically connected one each to respective ones of said bus bar means, conveyor borne circuit means including manually adjustable means for adjusting the resonance characteristics thereof electrically connected at one end to said collector means, the opposite ends of said distinguishable circuit means being electrically connectable to the opposite end of said conveyor borne circuit means whereby a resonant control circuit may be established including said conveyor borne circuit means and only the circuit means of a selected station and only upon engagement of the collector means with the bus bar means of the selected station, and a translating device located on said conveyor and included in said control circuit and operably responsive only to a resonant condition within said circuit to control an operation affecting the conveyor at the selected station.

7. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to and insulated from said power bus bar, spaced control collector means carried by said conveyor and guided to engage said power bus bar substantially continuously and to engage said interposed bus bar means sequentially as the collector means travel, a plurality of distinguishable circuit means having differing resonance characteristics located adjacent said stations and having first ends thereof electrically connected one each to respective ones of said bus bar means, conveyor borne circuit means including manually adjustable means for adjusting the resonance characteristics thereof electrically connected at one end to said collector means, the opposite ends of said distinguishable circuit means being electrically connectable to the opposite end of said conveyor borne circuit means whereby a resonant control circuit may be established including said conveyor borne circuit means and only the circuit means of a selected station and only upon engagement of the collector means with the bus bar means of the selected station, and a plurality of translating devices located one each at the respective stations and sequentially included in said control circuit and operably responsive only to a resonant condition within said circuit to control an operation affecting the conveyor at the selected station.

8. A trackway, a conveyor for travelling along said trackway, a propulsion motor carried by said conveyor, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to and insulated from said power bus bar, spaced control collector means carried by said conveyor and guided to engage said power bus bar substantially continuously and to engage said interposed bus bar means sequentially as the collector means travel, a plurality of distinguishable circuit means having differing resonance characteristics located adjacent said stations and having first ends thereof electrically connected one each to respective ones of said bus bar means, conveyor borne circuit means including manually adjustable means for adjusting the resonance characteristics thereof electrically connected at one end to said collector means, the opposite ends of said distinguishable circuit means being electrically connectable to the opposite end of said conveyor borne circuit means whereby a resonant control circuit may be established including said conveyor borne circuit means and only the circuit means of a selected station and only upon engagement of the collector means with the bus bar means of the selected station and means included in said control circuit operably responsive only to a resonant condition within said circuit to interrupt the flow of electric power to said propulsion motor at the selected station.

9. A trackway, a conveyor for travelling along said trackway, a plurality of track switches in said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to and insulated from said power bus bar, spaced control collector means carried by said conveyor and guided to engage said power bus bar substantially continuously and to engage said interposed bus bar means sequentially as the collector means travel, a plurality of distinguishable circuit means having differing resonance characteristics located adjacent said stations and having first ends thereof electrically connected one each to respective ones of said bus bar means, conveyor borne circuit means including manually adjustable means for adjusting the resonance characteristics thereof electrically connected at one end to said collector means, the opposite ends of said distinguishable circuit means being electrically connectable to the opposite end of said conveyor borne circuit means whereby a resonant control circuit may be established including said conveyor borne circuit means and only the circuit means of a selected station and only upon engagement of the collector means with the bus bar means of the selected station, and electric control means individual to said stations and sequentially included in said control circuit and operably responsive only to a resonant condition within said circuit to operate the corresponding track switch at the selected station.

10. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to and insulated from said power bus bar, spaced control collector means carried by said conveyor and guided to engage said power bus bar substantially continuously and to engage said interposed bus bar means sequentially as the collector means travel, a plurality of distinguishable circuit means having differing resonance characteristics located adjacent a plurality of said stations and having first ends thereof electrically connected one each to respective ones of said bus bar means, a plurality of partial control circuits having differing resonance characteristics located adjacent the others of said stations and having first ends thereof electrically connected one each to respective ones of said bus bar means, conveyor borne circuit means including manually adjustable means for adjusting the resonance characteristics thereof electrically connected at one end to said collector means, the opposite ends of said distinguishable circuit means being electrically connectable to the opposite end of said conveyor borne circuit means whereby a resonant control circuit may be established including said conveyor borne circuit means and only the circuit means of a selected station and only upon engagement of the collector means with the bus bar means of the selected station, a translating device carried by said conveyor and included in said control circuit and operatively responsive only to a resonant condition within said circuit to control an operation affecting the carrier at the selected station, a partial control circuit including manually adjustable means for adjusting the resonance characteristics thereof electrically connected at one end to said collector means, the opposite ends of said trackside partial control circuits being electrically connectable to the opposite end of said conveyor borne partial circuit whereby a resonant control circuit may be established including said conveyor borne partial circuit and only the partial control circuit of a selected station and only upon engagement of the collector means with the bus bar means of the selected station, and a plurality of translating devices located one each at the respective stations having said partial control circuits and sequentially included in said last-mentioned control circuit and operably responsive only to a resonant condition within said control circuit to control an operation affecting said conveyor at the selected station.

11. A trackway, a conveyor for travelling along said trackway, a plurality of track switches in said trackway, a propulsion motor carried by said conveyor, a power bus bar extending along said trackway, having a plurality of interruptions therein located at spaced distinguishable selectee stations alongside said trackway including track switch stations and stop stations, a plurality of selectee bus bar means, one of said means being interposed at an interruption of said power bus bar at each of said stations, said bus bar means being in alignment with respect to and insulated from said power bus bar, spaced control collector means carried by said conveyor and guided to engage said power bus bar substantially continuously and to engage said interposed bus bar means sequentially as the collector means travel, a plurality of distinguishable circuit means having differing resonance characteristics located adjacent said stop stations and having first ends thereof electrically connected one each to respective ones of said bus bar means, a plurality of partial control circuits having differing resonance characteristics located adjacent said track switch stations and having first ends thereof electrically connected one each to respective ones of said bus bar means, conveyor borne circuit means including manually adjustable means for adjusting the resonance characteristics thereof electrically connected at one end to said collector means, the opposite ends of said distinguishable circuit means being electrically connectable to the opposite end of said conveyor borne circuit means whereby a resonant control circuit may be established including said conveyor borne circuit means and only the circuit means of a selected stop station and only upon engagement of the collector means with the bus bar means of the selected stop station, means included in said control circuit and operatively responsive only to a resonant condition within said circuit to interrupt the flow of electric power to said propulsion motor at the selected stop station, a partial control circuit including manually adjustable means for adjusting the resonance characteristics thereof electrically connected at one end to said collector means, the opposite ends of said trackside partial control circuits being electrically connectable to the opposite end of said conveyor borne partial circuit whereby a resonant control circuit may be established including said conveyor borne partial circuit and only the partial control circuit of a selected track switch station and only upon engagement of the collector means with the bus bar means of the selected track switch station, and electric control means individual to said track switch stations and sequentially included in said last-mentioned control circuit and operably responsive only to a resonant condition within said control circuit to operate the corresponding track switch at the selected track switch station.

12. A trackway, a conveyor for travelling along said trackway, a power bus bar extending along said trackway, a plurality of spaced distinguishable selectee stations located alongside said trackway, said power bus bar having a plurality of interruptions therein individual to said stations, a plurality of electrical connecting means located adjacent said stations and arranged substantially in alignment with and insulated from said power bus bar at said interruptions, a plurality of distinguishable trackside partial circuits having differing resonance characteristics located adjacent said stations and having first ends thereof electrically connected one each to respective ones of said electrical connecting means, spaced control collector means carried by said conveyor and guided to engage and cooperate with said power bus bar substantially continuously and to engage and cooperate with said electrical connecting means sequentially as the collector means travel, a conveyor borne partial circuit including manually adjustable means for adjusting the resonance characteristics thereof electrically connected at one end to said collector means, the opposite ends of said distinguishable partial circuits being electrically connectable to the opposite end of said conveyor borne partial circuit whereby a resonant control circuit may be established including said conveyor borne partial circuit and only the partial circuit of a selected station and only upon engagement of the collector means with the electrical connecting means of the selected station, and means included in said control circuit operably responsive only to a resonant condition within said circuit to control an operation affecting the conveyor at the selected station.

13. A conveyor for travelling along a trackway, a power bus bar extending along said trackway, a plurality of spaced distinguishable selectee stations located alongside said trackway, said power bus bar having a plurality of interruptions therein individual to said stations, a plurality of electrical connecting means located adjacent said stations and arranged substantially in alignment with and insulated from said power bus bar at said interruptions, a plurality of distinguishable trackside partial circuits having differing resonance characteristics located adjacent said stations and having first ends thereof electrically connected one each to respective ones of said electrical connecting means, spaced control collector means carried by said conveyor and guided to engage and cooperate with said power bus bar substantially continuously and to engage and cooperate with said electrical connecting means sequentially as the collector means travel, a conveyor borne partial circuit including manually adjustable means for adjusting the resonance characteristics thereof electrically connected at one end to said collector means, the opposite ends of said distinguishable partial circuits being electrically connectable to the opposite end of said conveyor borne partial circuit whereby a resonant control circuit may be established including said conveyor borne partial circuit and only the partial circuit of a selected station and only upon engagement of the collector means with the electrical connecting means of the selected station, and means included in said control circuit operably responsive only to a resonant condition within said circuit to control an operation affecting the conveyor at the selected station.

References Cited in the file of this patent

UNITED STATES PATENTS

| Number | Name | Date |
|---|---|---|
| 795,600 | Franklin et al. | July 25, 1905 |
| 884,630 | Bauer | Apr. 14, 1908 |
| 1,234,492 | Rosenwinkel et al. | July 24, 1917 |
| 1,544,882 | Bethenod | July 7, 1925 |
| 1,797,651 | Gergacsevicks et al. | Mar. 24, 1931 |
| 1,797,864 | Harlandt | Mar. 24, 1931 |
| 1,817,692 | Kloss et al. | Aug. 4, 1931 |
| 1,871,724 | Moss | Aug. 16, 1932 |
| 1,962,546 | Wooley et al. | June 12, 1934 |
| 2,254,285 | Harris et al. | Sept. 2, 1941 |
| 2,385,917 | Harwood et al. | Oct. 2, 1945 |
| 2,392,417 | Spafford | July 8, 1946 |
| 2,486,221 | Spafford | Oct. 25, 1949 |
| 2,486,222 | Spafford | Oct. 25, 1949 |

FOREIGN PATENTS

| Number | Country | Date |
|---|---|---|
| 252,036 | Great Britain | printed 1926 |